United States Patent [19]

Bagchi et al.

[11] Patent Number: 5,013,640

[45] Date of Patent: May 7, 1991

[54] PREPARATION OF LOW VISCOSITY SMALL-PARTICLE PHOTOGRAPHIC DISPERSIONS IN GELATIN

[75] Inventors: Pranab Bagchi, Webster; Gary J. McSweeney, Hilton; Steven J. Sargeant, Honeoye Falls, all of N.Y.

[73] Assignee: Eastman Kodak Company, Rochester, N.Y.

[21] Appl. No.: 366,397

[22] Filed: Jun. 15, 1989

[51] Int. Cl.$^5$ .................. G03C 7/26; G03C 7/32
[52] U.S. Cl. .................. 430/546; 430/636; 430/637; 430/638; 430/639; 430/640; 252/315.01; 252/363.5
[58] Field of Search ............ 252/315.01, 363.5; 430/546, 636, 637, 638, 639, 640

[56] References Cited

U.S. PATENT DOCUMENTS

| | | | |
|---|---|---|---|
| 3,413,123 | 11/1968 | Nittol et al. | 96/94 |
| 3,516,830 | 5/1970 | Whiteley | 96/67 |
| 3,762,928 | 10/1973 | Willems | 96/114.5 |
| 3,788,857 | 1/1974 | Poucke et al. | 430/546 |
| 3,860,425 | 1/1975 | Ono et al. | 96/82 |
| 3,989,529 | 11/1976 | Viro et al. | 96/100 |
| 4,013,578 | 3/1977 | Child et al. | 252/363.5 |
| 4,284,709 | 8/1981 | Tomka | 430/546 |
| 4,388,403 | 6/1983 | Helling et al. | 430/546 |
| 4,444,876 | 4/1984 | Maekawa et al. | 430/635 |
| 4,582,781 | 4/1986 | Chen et al. | 430/527 |
| 4,649,102 | 3/1987 | Mukunoki et al. | 430/527 |
| 4,868,097 | 9/1989 | Aotsuka et al. | 430/637 |
| 4,892,806 | 1/1990 | Briggs et al. | 430/546 |

Primary Examiner—Hoa Van Le
Attorney, Agent, or Firm—Paul A. Leipold

[57] ABSTRACT

The invention is generally accomplished by utilization of a surfactant for very small particle photographic dispersions. Three types of such surfactants that have been identified are as follows:

Type A—Surfactant comprising 6 to 22 carbon atom hydrophobic tail with one or more attached hydrophilic chains comprising at least 8 oxyethylene and/or glycedyl ether groups that may or may not be terminated with a negative charge such as a sulfate group.

Type B—Block oligomeric surfactants comprising hydrophobic polyoxypropylene blocks (A) and hydrophilic polyoxyethylene blocks (B) joined in the manner of A-B-A, B-A-B, A-B, (A-B)$_n$≡G≡(B-A), or (B-A)$_n$≡G≡(A-B)$_n$, where G is a connective organic moiety and n is between 1 and 3.

Type C—Sugar surfactants, comprising between one to three 6 to 22 carbon atom hydrophobic tail with one or more attached hydrophilic mono or oligosaccharidic chains that may or may not be terminated by a negatively charged group such as a sulfate group.

The preferred colloid chemical criterion of the photographic dispersion material in this invention is that they are formed with particle diameters between about 5 nm and 100 nm that have been prepared by precipitation from solution by a solvent and/or pH shift.

28 Claims, 4 Drawing Sheets

PREPARATION OF LOW VISCOSITY SMALL-PARTICLE PHOTOGRAPHIC DISPERSIONS IN GELATIN

FIELD OF THE INVENTION

This invention relates to the formation and formulation of very small particle dispersion for the purpose of coating. In a preferred embodiment it relates to the formation and formulation of very small particle photographic disPersions in admixture with gelatin, which is generally called a melt.

PRIOR ART

In the photographic arts it is common to utilize gelatin for the formation of photographically active elements for film production. In the formation of color films couplers are utilized in gelatin layers for color formation. These layers are formed by laying down thin coatings of gelatinous aqueous dispersions of the coupler, along with a sensitized silver halide emulsion.

In formation of gelatinous dispersions of couplers, it has been known to utilize surfactants to aid in formation of stable dispersions. Generally coupler dispersions, suitable for use in photography, are prepared by milling operations that result in dispersions of couplers that range in particle diameters between 100 and 1000 nm.

It has also been known to precipitate hydrophobic components of photographic systems starting from a solution state to form a stable fine particle colloidal dispersion. This is generally achieved by dissolving the coupler in a water miscible solvent aided by addition of base to ionize the coupler, addition of surfactant with subsequent precipitation of the photographic component by lowering the pH, or by shift in concentration of the two or more miscible solvents such that the photographic component is no longer soluble in the continuous phase and the precipitate is a fine colloidal dispersion.

In the United Kingdom Patent 1,193,349-Townsley et al discloses a process whereby a color coupler is dissolved in a mixture of water miscible organic solvent and aqueous alkali. The solution of color coupler is then homogeneously mixed with an aqueous acid medium including a protective colloid. Thus, there is formed a dispersion of precipitated color coupler by shift of pH, and this dispersion of color coupler when mixed with a dispersion of an aqueous silver halide emulsion and coated on a support, forms a photographic element.

In an article in *Research Disclosure* 16468, Dec. 1977, pages 75-80 entitled "Process for Preparing Stable Aqueous Dispersions of Certain Hydrophobic Materials" by W. J. Priest, a method of forming stable aqueous dispersions of hydrophobic photographic material was disclosed. The process of Priest involves the formation of an alkaline aqueous solution of an alkali soluble color forming coupler compound in the presence of a colloid stabilizer or polymeric latex. The alkali solution is then made more acidic in order to precipitate the hydrophobic protonated color forming coupler compounds. The droplets of color forming coupler compounds are stabilized against excessive coagulation by adsorption of a colloid stabilizer.

U.S. Pat. No. 4,388,403 Helling et al discloses a process of preparation of dispersions of hydrophobic substances in water. In Helling et al the dispersions of hydrophobic substances in water are prepared by dissolving the hydrophobic substance together with an ionic polyaddition or condensation product in an organic, water miscible solvent or a mixture of such a solvent with water, diluting the solution with water and removing the organic solvent. This process is a preparation that causes the particle formation by solvent shift of the solution. Helling et al suggests utilization of the Process for preparation of photographic recording materials.

While systems using particles formed by precipitation of particles from solution have been somewhat successful and photographic components have been formed using such dispersions, it is not believed that such systems have been successfully commercialized. One difficulty in commercialization is that small particle dispersions when combined with the customary amount of gelatin form very high viscosity dispersions. While the viscosity can sometimes be reduced by utilization of conventional surfactants, the amount of surfactant required is very high, which leads to problems such as poor adhesion to the photographic support. It is also unsatisfactory because of the added cost of the increased amount of surfactant. It is further unsatisfactory in that high amounts of surfactant have resulted in undesirable effects in the film because of the interaction of the surfactant causing stains and color change of the formed dye.

Therefore, there is a need for a way of forming and formulating small particle dispersions in gelatin at low viscosity and with low surfactant addition. Further, there is a need to lower the cost of commercial formation of small particle dispersions by lowering the quantity of surfactant required.

THE INVENTION

An object of the invention is to overcome the very high viscosity of prior small-particle dispersions when admixed with gelatin in aqueous solution for coating a photographic film element.

The invention is generally accomplished by utilization of a surfactant for small particle dispersions that is composed of one or more of the following types of surfactants:

Type A—An amphiphilic surfactant comprising a 6 to 22 carbon atom hydrophobic tail with one or more attached hydrophilic chains comprising at least 8 oxyethylene and/or glycedyl ether groups that may or may not be terminated with a negative charge such as a sulfate group.

Type B—Block oligomeric surfactants comprising hydrophobic polyoxypropylene blocks (A) and hydrophilic polyoxyethylene blocks (B) joined in the manner of A-B-A, B-A-B, A-B, $(A\text{-}B)_n\equiv G\equiv(B\text{-}A)$, or $(B\text{-}A)_n\equiv G\equiv(A\text{-}B)_n$, where G is a connective organic moiety and n is between 1 and 3.

Type C—Sugar surfactants, comprising between one to three 6 to 22 carbon atom hydrophobic tail with one or more attached hydrophilic mono or oligosaccharidic hydrophilic chains that may or may not be terminated by a negatively charged group such as a sulfate group.

The preferred colloid particles of the photographic dispersion material of this invention have particle diameters between about 5 nm and 100 nm and have been prepared by precipitation from solution by solvent and/or pH shift.

MODES OF PRACTICING THE INVENTION

The dispersion forming system of the invention has numerous advantages over prior practices. The system allows less use of surfactant, this results in cost savings. It also results in less likelihood of the surfactant interacting with other ingredients of the photographic system to cause stains and color shifts of the formed dye. Another advantage is that it produces low viscosity dispersions of very fine particles formulated with conventional ratios of water, gelatin, and coupler so that conventional coating methods by slide hoppers (T. A. Russell U. S. Pat. No. 2,761,791) may be employed for producing multilayer photographic coatings. Since, in many cases, fine particle couplers are more efficient in producing dye density, less coupler can be used than when large particle coupler dispersions are utilized leading to cost savings.

Figure 1:
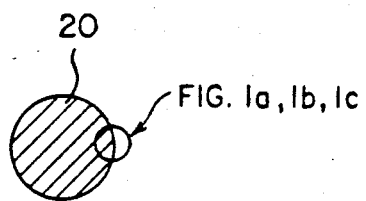
FIG. 1 is a cross section view of a small particle coupler particle formed by precipitation.
Figure 2:
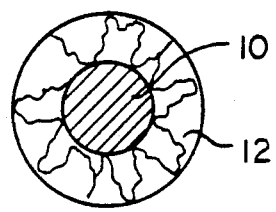
FIG. 2 is a cross section view of a small particle coupler dispersion formed by Precipitation, surrounded by a layer of adsorbed gelatin molecule.
Figure 3:
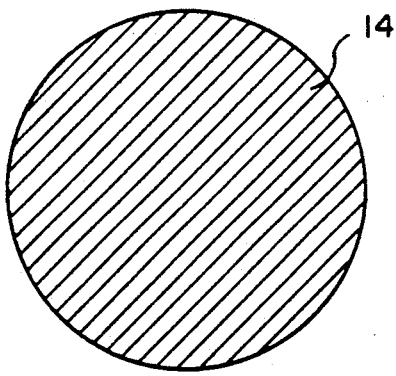
FIG. 3 is a cross section view of the large coupler particle, of the prior art, formed by a milling prodecure.
Figure 4:
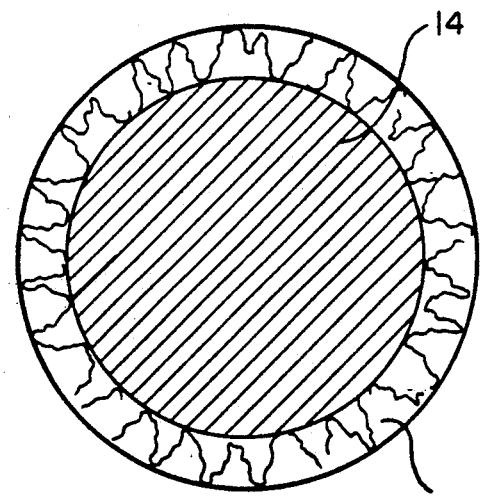
FIG. 4 is a cross section view of the large coupler particle, of the prior art, surrounded by a layer of adsorbed gelatin molecules.

Dispersions of small particles of diameter less than about 100 nm in gelatin have been difficult to form with low viscosities with low amounts of surfactants. It is theorized that the reason for this is that particles of coupler in gelatin solution adhere or adsorb gelatin to their surface. The thickness of the adhered layer is considered to be substantially the same regardless of particle size. Therefore, if there are many fine particles making up the same weight of coupler in a dispersion as compared with the similar dispersion of larger particles of the same total weight of the dispersed material, there will be a much greater amount of surface area in the dispersion of small particles. Therefore as there is greater amount of surface area there will be a greater amount of gelatin that is adhered to the particle surface and removed from the dispersion thereby raising the viscosity of the dispersion by drastically increasing the hydrodynamic volume of the particles. The drawings of FIGS. 1, 2, 3, and 4 illustrate this phenomenon. In FIG. 2 is illustrated coupler particles 10 having adhered thereto a unimolecular layer of gelatin 12. As represented the particle 10 is a fine or small particle. As illustrated the layer of gelatin is of a thickness of about the diameter of the particle. FIG. 3 illustrates a larger milled coupler particle 14 of the prior art. As illustrated in FIG. 4 this particle is shown in a gelatin dispersion having a gelatin layer 16 adhered thereto. The larger particle 14 has an illustrated diameter much greater than that of particle 10 but the adhered gel layer 16 is about the same thickness. Simple calculations as given below show that the increase in the hydrodyanmic volume fraction of a small particle dispersion having an adhered gelatin layer is about 135% as compared with about 9% for that of a larger particle dispersion having an adhered gelatin layer, both dispersions being at the same coupler content of 5%.

Hydrodynamic volume ratio of small particle (diameter=20 nm, radius=10 nm) coupler dispersion after adsorption of a gel layer (thickness of gelatin layer=20 nm) is $$R_{SP} = \frac{\frac{4}{3}\pi(10+20)^3}{\frac{4}{3}\pi(10)^3} = \left[\frac{30}{10}\right]^3 = 27$$

Therefore, the hydrodynamic volume fraction of the particle phase of the dispersion of a small particle coupler dispersion containing 5% coupler is about $5 \times 27 = 135\%$. It is not actually possible for the hydrodynamic volume fraction of the dispersed phase to exceed 100% of the volume of the dispersion; however, this simple computation indicates that the adsorption of gelatin onto the small particle dispersion causes the hydrodynamic volume fraction of the dispersion to increase dramatically.

In contrast hydrodynamic volume ratio of large particle (diameter=200 nm, radius=100 nm) coupler dispersion after adsorption of a gel layer (thickness of gelatin layer as before=20 nm) is $$R_{LP} = \frac{\frac{4}{3}\pi(100+20)^3}{\frac{4}{3}\pi(100)^3} = \left[\frac{120}{100}\right]^3 = 1.7$$

The hydrodynamic volume fraction of the particle phase of the dispersion of a large particle coupler dispersion containing 5% coupler is about $5 \times 1.7 = 8.5\%$. Such simple calculation, therefore, show that the adsorption of gelatin onto large particle dispersion causes the hydrodynamic volume fraction of the dispersion to increase only slightly.

It can be seen by this simple calculation that in a dispersion of 5% coupler with gelatin, the gelatin will be substantially removed from the solution by adhering to the fine particles. This will lead to a large increase in the volume fraction of the dispersed phase producing a large viscosity of the gelled small particle dispersion. However, in this case of large particle dispersion, the effective increase of the volume fraction of the dispersed phase is small, which results in dispersions with relatively low viscosities.

Figure 1A:
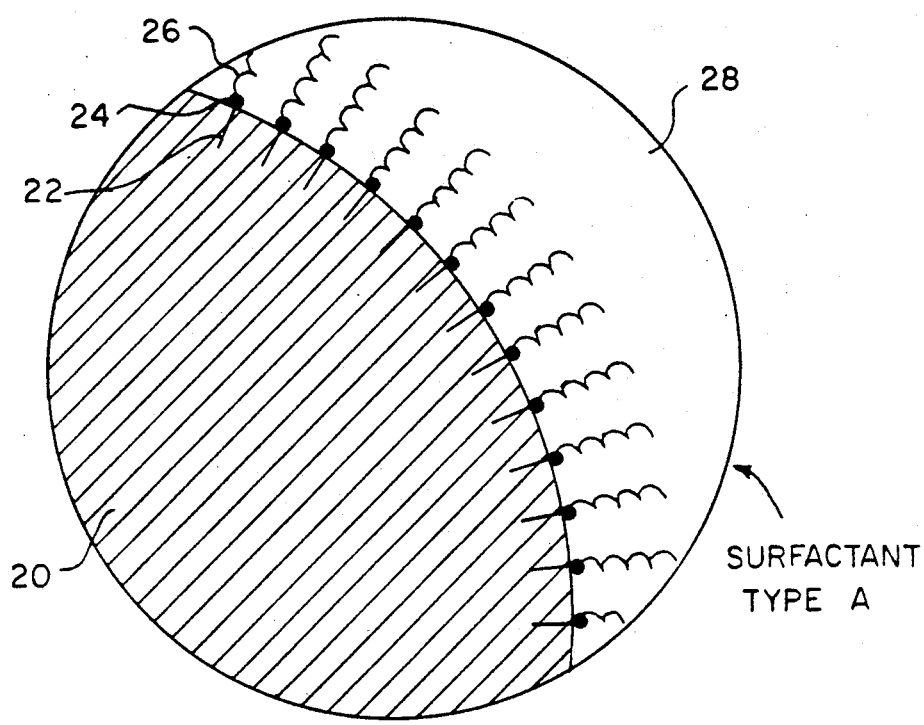
FIGS. 1A, 1B, and 1C show an enlarged view of the interface of the small coupler particle of FIG. 1, illustrating the adsorption of surfactant to the Particle interface, using Type A, B, and C surfactants.
Figure 1B:
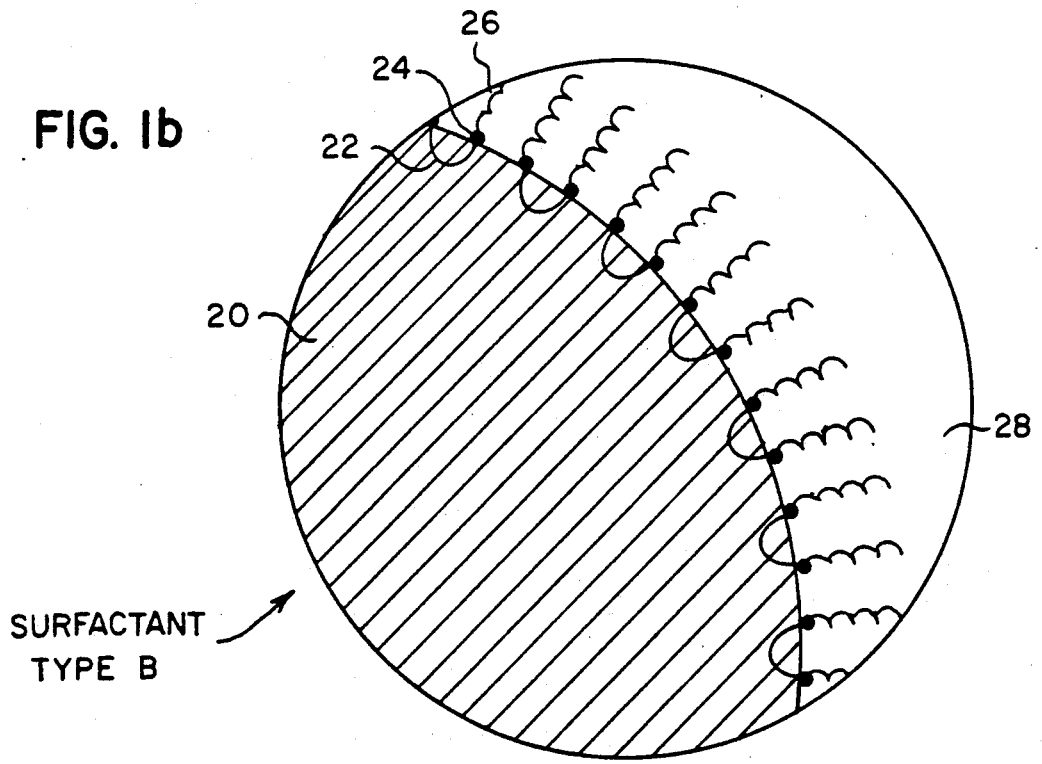
Figure 1C:
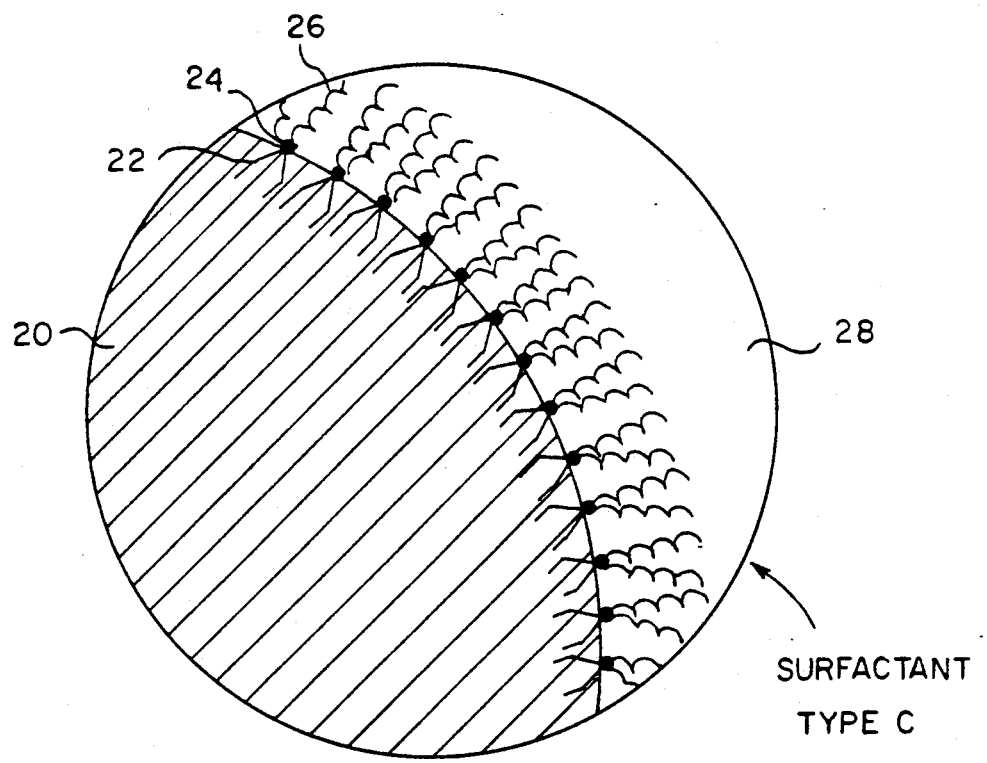

As illustrated in FIGS. 1, 1A, 1B, and 1C it is theorized that the surfactants with very large hydrophilic chains of the invention adhere to the surface of the fine particle 20, and the presence of the very thin hydrophilic layer prevents the adhering of gelatin to the surface of the particles. The fine particle 20 is illustrated in FIGS. 1A, 1B, and 1C with the hydrophobic segment 22 of the surfactant 24 attracted to the surface of particle 20. The hydrophilic portion 26 extends into the aqueous gelatin phase 28. The surfactants of the invention are more effective in providing for stable dispersions with lesser amounts of surfactant because of their large hydrophilic tails that provide good steric stabilization (See, for example, P. Bagchi, J. Colloid and Interface Science, Vol. 47, page 86 and 110, 1974; Vol. 41, page 380, 1972; and Vol. 50, page 115, 1975).

In the examples are shown the precipitated small particle dispersions of the previously indicated prior art of Priest using couplers of the following structures:

The invention is suitable for precipitated small particle dispersions of many couplers and photographic compounds. Examples of other such compounds are as follows:

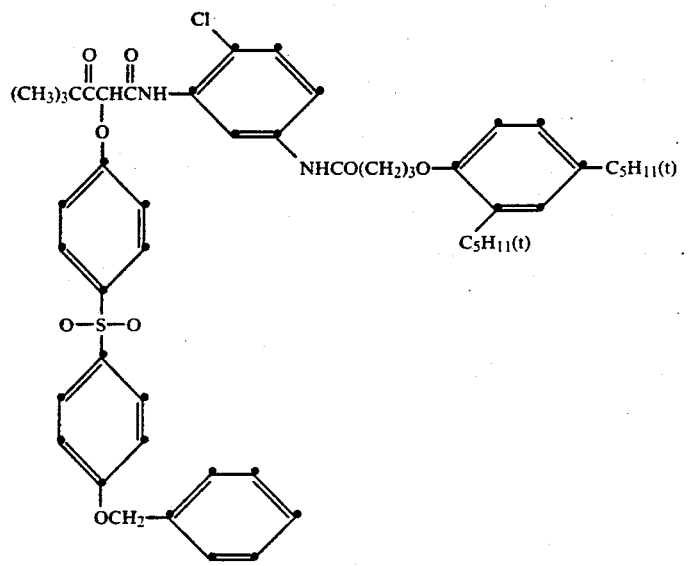

Yellow Image Coupler P and

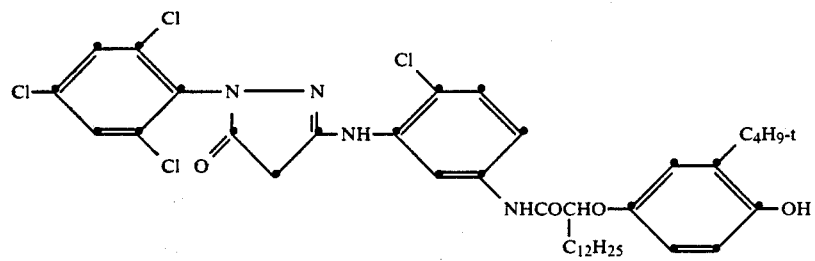

Magenta Image Coupler Q

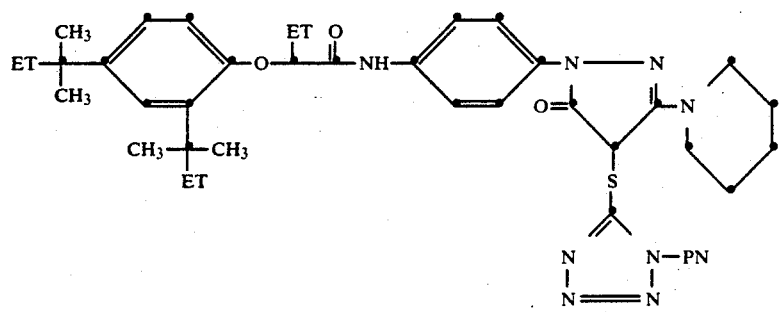

-continued
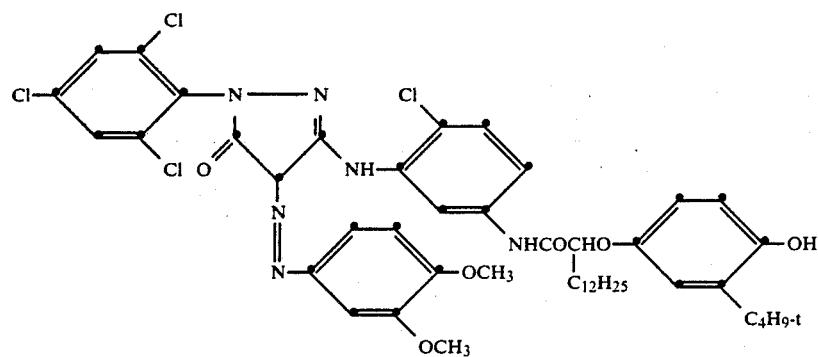
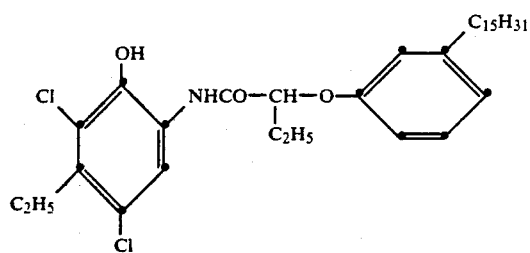
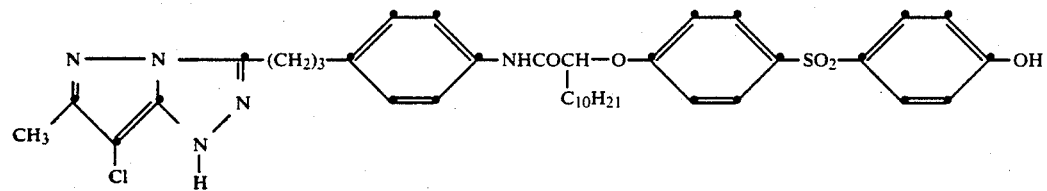
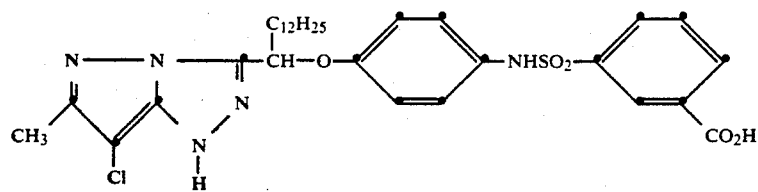
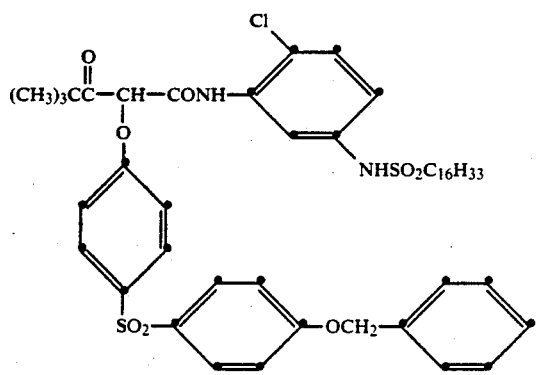

-continued
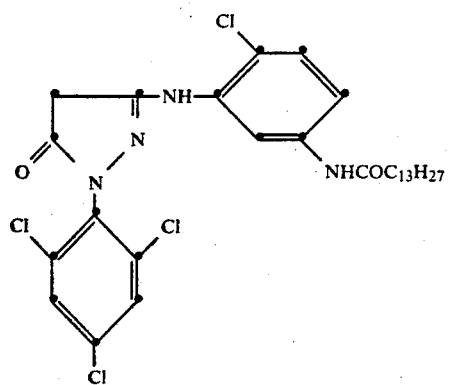
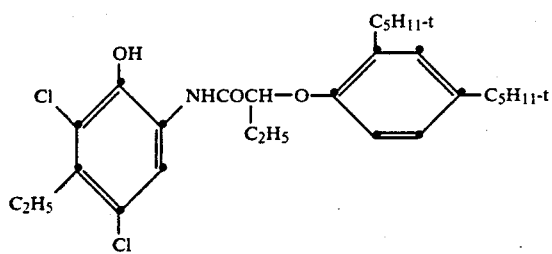
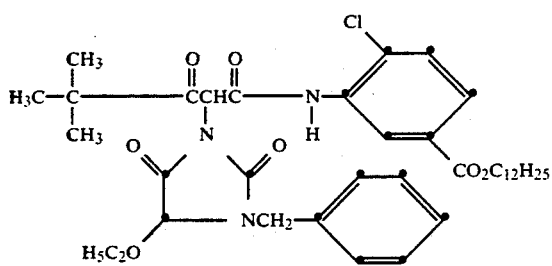
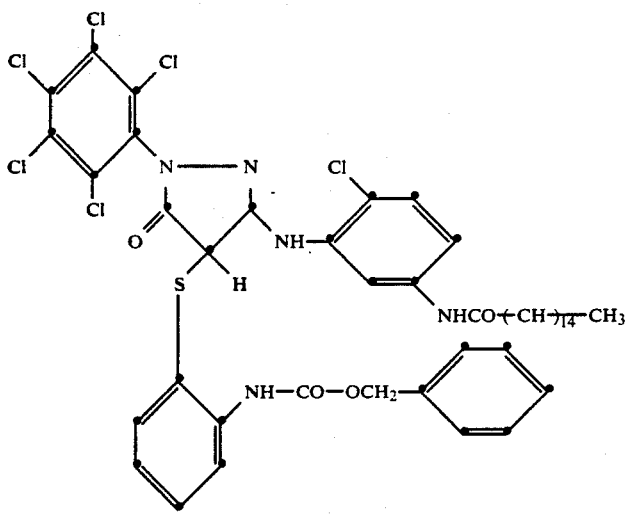
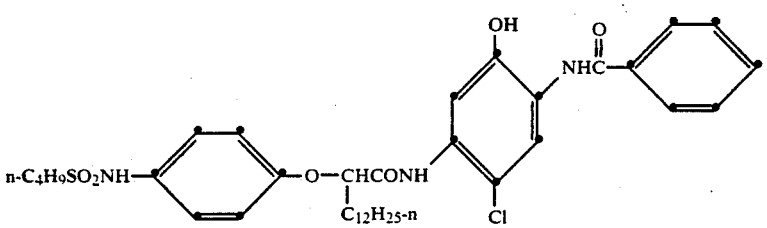

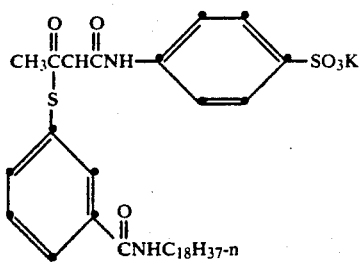

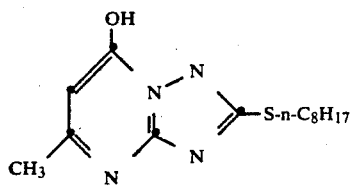

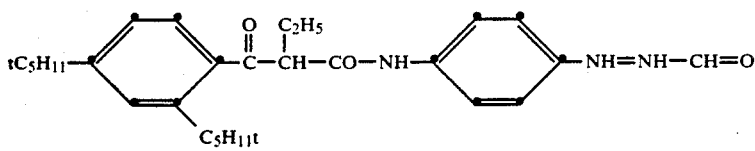

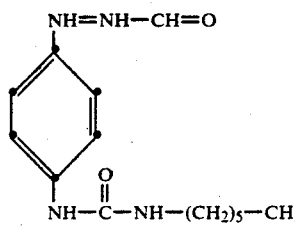

The small particle dispersions were prepared using the following surfactants of the prior art:

Control Surfactant X
(Aerosol OT, sold by
American Cyanamid)

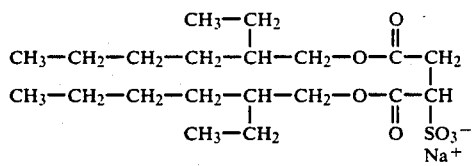

and

Control Surfactant Y
(Aerosol A102, sold
by American Cyanamid)

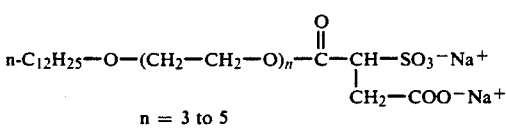

n = 3 to 5

These materials are formulated for use in photographic systems in admixture with gelatin at a composition of 8% coupler and 5% gelatin to produce dispersion with viscosities much larger than 100 centipoise at 50° C. and 66 $Sec^{-1}$ of shear rate. At such high viscosities melts can not be economically coated using conventional slide hopper coating devices that are generally utilized for coating photographic films. It will be shown that the addition of the prior art surfactant Y to a level of 0.6 g of surfactant per g of coupler to the 8% coupler, 5% gelatin small particle dispersion lowers the viscosity to less than 25 cp, which is necessary for satisfactory slide hopper coatings of the melts. All viscosity values in the Examples are measured at 50° C. and 66 $sec^{-1}$ using either a Brookfield LVDT viscometer or a Contraves Rheomat-108. It will also be shown that the use of surfactants of this invention require much less than half the amount of surfactant required with prior art surfactant Y to bring the viscosity down to the same level. This, not only constitutes cost savings, but also minimization of adverse photographic effects already Pointed out that arises from the use of an excessive quantity of surfactant.

Large particle dispersions made by conventional milling procedures of prior art (Eg., The theory of the Photographic Processes, Ed. Th. Janes, 4th Ed., Macmillan, N.Y., 1977, page 348) are generally prepared using the surfactant Alkanol XC (DuPont) the following structure:

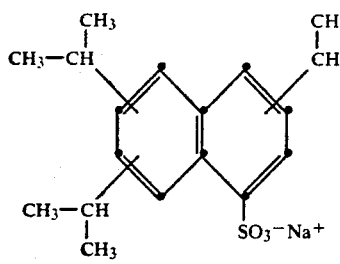

Prior Art Large Particle
Control Surfactant Z
Alkanol XC (DuPont)

oxyethylene and/or glycedyl ether groups that may or may not be terminated with a negative charge such as a sulfate group. Examples of such surfactants are shown in Table A.

TABLE A

Examples of Surfactants of This Invention That Belong to Type A

| ID | Name (Manufacturer) | Best Known Structure | Molecular Weight |
|---|---|---|---|
| A-1 | Olin 10G (Dixie) | $t\text{-}C_9H_{19}\text{-}\bigcirc\text{-}O\text{-}(CH_2\text{-}CH\text{-}O)_{10}\text{-}H$ with $CH_2\text{-}OH$ branch | 961 |
| A-2 | Polystep B-23 (Stepan) | $n\text{-}C_{12}\text{-}H_{23}\text{-}O\text{-}(CH_2\text{-}CH_2\text{-}O)_{12}SO_3^-Na^+$ | 817 |
| A-3 | Triton TX-102 (Rohm & Haas) | $C_8H_{17}\text{-}\bigcirc\text{-}O\text{-}(CH_2\text{-}CH_2\text{-}O)_{12}\text{-}OH$ | 734 |
| A-4 | Tricol LAL-23 (Emery) | $n\text{-}C_{12}H_{25}\text{-}O\text{-}(CH_2\text{-}CH_2\text{-}O)_{23}\text{-}OH$ | 1198 |
| A-5 | Avanel S-150 (PPG) | $C_{12}H_{25}\text{-}O\text{-}(CH_2\text{-}CH_2\text{-}O)_{15}\text{-}CH_2$ / $Na^+SO_3^-\text{-}CH_2$ | 976 |

Surfactants suitable for this invention are of the following types:

Type A—Surfactants comprising between 6 to 22 carbon atom hydrophobic tail with one or more attached hydrophilic chains comprising at least 8

The most preferred surfactants of this class for this invention are A-1 and A-2, as these produce the greatest reduction of the viscosity of geled small particle dispersions melts.

Type B—Block oligomeric surfactants comprising hydrophobic polyoxypropylene blocks A and hydrophilic polyoxyethylene blocks B joined in the manner of A-B-A, B-A-B, A-B, $(A\text{-}B)_n \equiv G \equiv (B\text{-}A)$, or $(B\text{-}A)_n \equiv G \equiv (A\text{-}B)_n$, where G is a connective organic moiety and n is between 1 and 3. Examples of such surfactants are shown in Table B.

TABLE B

Examples of Surfactants of This Invention That Belong to Type-B

| ID | Name (Manufacturer) | Best Known Structure | Molecular Weight Range |
|---|---|---|---|
| B-1 | Pluronic ™ Polyols (BASF) | $HO\text{-}(CH_2CH_2\text{-}O)_a\text{-}(CH\text{-}CH_2\text{-}O)_b\text{-}$ with $CH_3$ branch; $H\text{-}(OCH_2\text{-}CH_2)_c\text{-}$ | 1,100 to 14,000 |
| B-2 | Pluronic ™ —R Polyols (BASF) | $HO\text{-}(CH\text{-}CH_2\text{-}O)_a\text{-}(CH_2\text{-}CH_2\text{-}O)_b\text{-}$ with $CH_3$ branch; $H\text{-}(O\text{-}CH_2\text{-}CH)_c\text{-}$ with $CH_3$ branch | 1,900 to 9,000 |
| B-3 | Plurodot ™ Polyols (BASF) | Liquid Polyethers Based on Alkoxylated Triols | 3,200 to 7,500 |

TABLE B-continued
Examples of Surfactants of This Invention That Belong to Type-B

| ID | Name (Manufacturer) | Best Known Structure | Molecular Weight Range |
|---|---|---|---|
| B-4 | Tetronic ™ Polyols (BASF) | HO—(CH$_2$CH$_2$—O)$_y$—(CH—CH$_2$—O)$_x$\\                                           CH$_3$         N—CH$_2$—<br>HO—(CH$_2$CH$_2$—O)$_y$—(CH—CH$_2$—O)$_x$/<br>                                          CH$_3$<br>HO—(CH$_2$CH$_2$—O)$_y$—(CH—CH$_2$—O)$_x$\\<br>                                          CH$_3$         N—CH$_2$—<br>HO—(CH$_2$CH$_2$—O)$_y$—(CH—CH$_2$—O)$_x$/<br>                                          CH$_3$ | 3,200 to 27,000 |

The preferred surfactants of Type B for this invention are those which have at least 1-5 times polyoxyethylene compared to the polyoxypropylene groups. The most preferred surfactant is Pluronic L-44 of Type B-1, where a≈c≈10; b≈20; and molecular weight is about 2,200.

Type C: Sugar surfactants, comprising between one and three 6 to 22 carbon atom hydrophobic tails with one or more attached hydrophilic mono, di, tri or oligosaccharidic chains that may or may not be terminated by a negatively charged group such as a sulfate group. Examples of such surfactants are shown in Table C.

TABLE C
Example of Surfactants of This Invention That Belong to Type C

C-1:
$$R\diagdown\underset{R\diagup}{C}\diagup\begin{array}{l}CH_2NH-\overset{O}{\underset{\|}{C}}-(CHOH)_p-CH_2-OH\\ CH_2-NH-\overset{O}{\underset{\|}{C}}-(CHOH)_p-CH_2-OH\end{array}$$

where, R = n-CH$_3$—(CH$_2$)$_X$ (where X = 3 to 10)

R = ⬡—CH$_2$—CH$_2$—

P = 3 to 10

C-2: CH$_3$—(CH$_2$)$_n$—NH— [disaccharide structure with two sugar rings, CH$_2$OH, HO, OH groups]

where, n = 3 to 15

C-3:
$$R\diagdown\underset{R\diagup}{C}\diagup\begin{array}{l}CH_2NH-\overset{O}{\underset{\|}{C}}-(CH_2OH)_p-CH_2OH\\ CH_2OH\end{array}$$

where, R = n-CH$_3$—(CH$_2$)$_X$ (where X = 3 to 10)

R = ⬡—CH$_2$—OH

P = 3 to 15

C-4:

TABLE C-continued
Example of Surfactants of This Invention That Belong to Type C R—⬡ with two substituents:
OCH$_2$—CH(OH)—CH$_2$—N(CH$_3$)—CH$_2$—(CH$_2$)$_4$—CH$_2$OH
OCH$_2$—CH(OH)—CH$_2$—N(CH$_3$)—CH$_2$—(CH$_2$)$_4$—CH$_2$OH where, R = n-CH$_3$—(CH$_2$)$_X$—
(where, X = 1 to 5)

C-5:

CH$_3$—(CH$_2$)$_n$—O—CH$_2$—CH(OH)—CH$_2$—NH—$\overset{O}{\underset{\|}{C}}$—(CHOH)$_4$CH$_2$OH where, n = 3 to 15

C-6:

CH$_3$—(CH$_2$)$_n$—CH $\begin{array}{l}CH_2-OCH_2-CH(OH)-CH_2-NH-\overset{O}{\underset{\|}{C}}-(CHOH)_p-CH_2OH\\ CH_2-OCH_2-CH(OH)-CH_2-NH-\overset{O}{\underset{\|}{C}}-(CHOH)_p-CH_2OH\end{array}$ where, n = 2 to 12
p = 3 to 10

C-7: CH$_3$—(CH$_2$)$_n$—$\overset{O}{\underset{\|}{C}}$—N $\begin{array}{l}CH_2-NH-\overset{O}{\underset{\|}{C}}-(CHOH)_p-CH_2OH\\ CH_2\\ CH_2\\ CH_2-NH-\overset{O}{\underset{\|}{C}}-(CHOH)_p-CH_2OH\end{array}$ where, n = 2 to 18
p = 3 to 10

TABLE C-continued

Example of Surfactants of This Invention That Belong to Type C

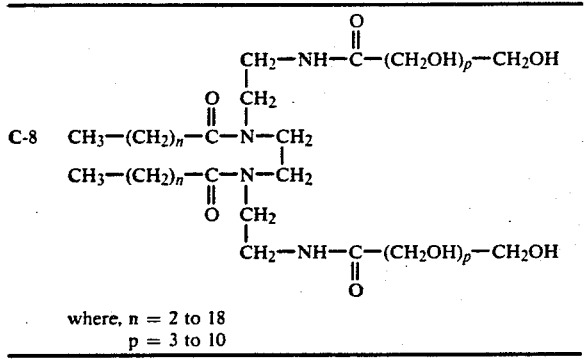

where, n = 2 to 18
p = 3 to 10

The preferred surfactant of this invention for Type C is structure C-1 where, $R = n\text{-}CH_3\text{-}(CH_2)_3\text{-}$ and $p=4$. In this description it will be referred to as C-1*.

Generally the invention finds its preferred embodiments in the particle sizes typically formed by the phase separation precipitation process. These particles are typically below about 100 nm. The typical size ranges are between about 10 and 50 nm with the preferred range being between about 10 and about 30 nm as effective viscosity control surface active agents are most important with smaller particles. The term fine or small particle dispersion as utilized herein is intended to refer to those particles below about 100 nm.

A BRIEF DESCRIPTION OF THE APPARATUS FOR THE PREPARATION OF THE SMALL PARTICLE DISPERSIONS UTILIZED IN THIS INVENTION

Figure 5:
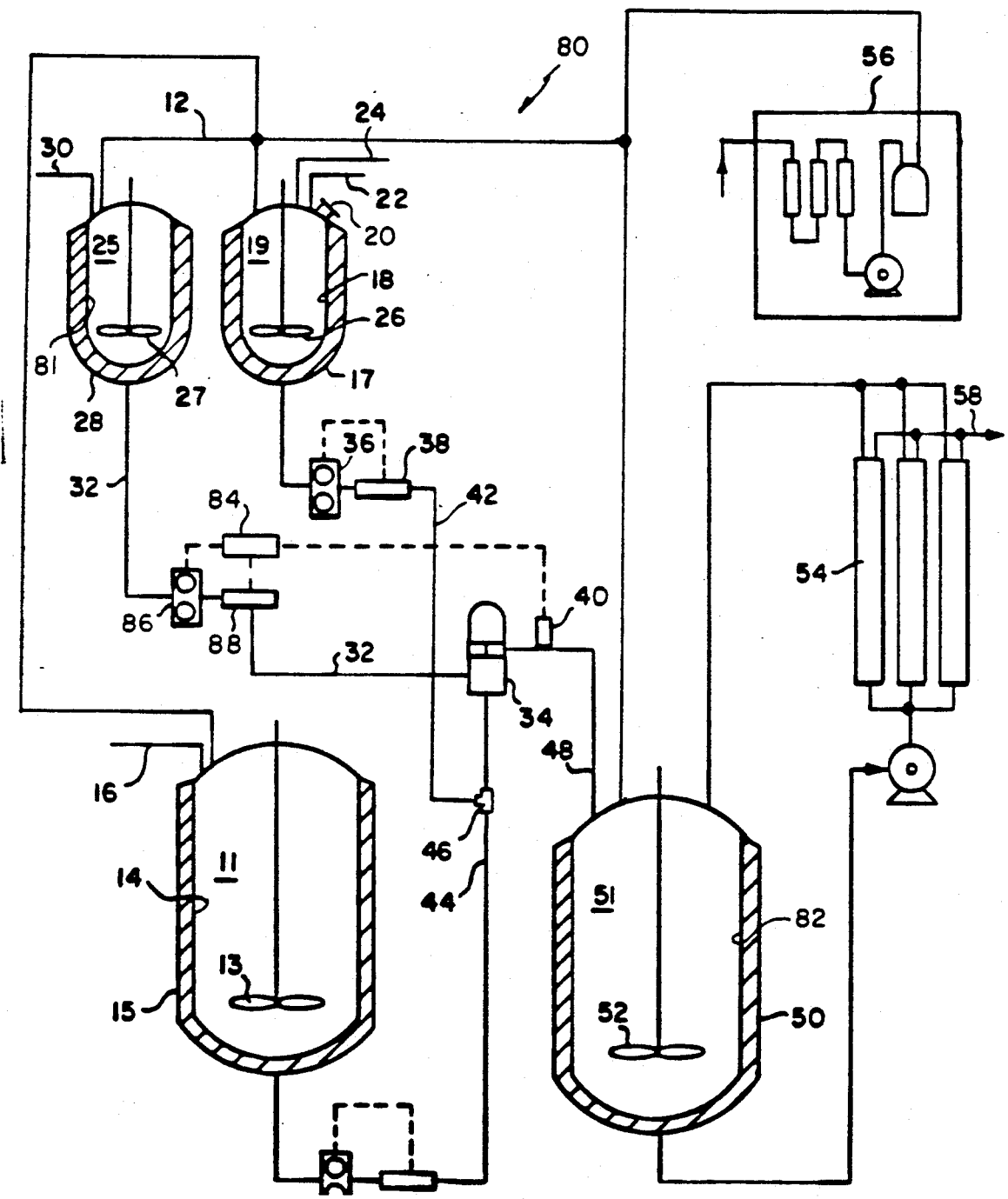
FIG. 5 illustrates the equipment utilized for the precipitation of the small particle dispersions utilized in this invention.

The schematic of FIG. 5 illustrates apparatus 80 for the preparation of the small particle dispersions utilized to demonstrate this invention. The apparatus is provided with high purity water delivery lines 12. Tank 14 contains a solution 11 of surfactant and high purity water. Jacket 15 on tank 14 regulates the temperature of the tank. Surfactant enters the tank through line 16. Tank 18 contains a photographic component solution 19. Jacket 17 controls the temperature of materials in tank 18. The tank 18 contains a coupler entering through manhole 20, a base material such as aqueous sodium hydroxide solution entering through line 22, and solvent such as n-propanol entering through line 24. The solution is maintained under agitation by the mixer 26. Tank 81 contains acid solution 25 such as propionic acid entering through line 30. The tank 81 is provided with a heat jacket 28 to control the temperature, although with the acids normally used, it is not necessary. In operation, the acid is fed from tank 81 through line 32 to mixer 34 via the metering pump 86 and flow meter 88. A pH sensor 40 senses the acidity of the dispersion as it leaves mixer 34 and allows the operator to adjust the acid pump 86 to maintain the proper pH in the dispersion exiting the mixer 34. The photographic component 19 passes through line 42, metering pump 36, flow meter 38, and joins the surfactant solution in line 44 at the T fitting 46. The particles are formed in mixer 34 and exit through pipe 48 into the ultrafiltration tank 82. In tank 82 the dispersion 51 is held while it is washed by ultrafiltration membrane 54 to remove the solvent and salt from solution and adjust the material to the proper water content for makeup as a photographic component. The source of high purity water is purifier 56.

Agitator 13 agitates the surfactnat solution in tank 14. Agitator 27 agitates the acid solution in tank 81. The impurities are removed during the ultrafiltration process through permeate (filtrate) stream 58.

MODE OF VISCOSITY CHARACTERIZATION AND MEASUREMENT OF THE INVENTION

The viscosity of the dispersion formed in accordance with the invention may be adjusted to any desired amount by the addition of varying amounts of the surfactants of the invention. However, typically it is preferred that the surfactant be utilized in amounts of below about 25% of the amount of coupler by weight. This is preferred as it minimizes the possibility of yellowing or other defects associated with high surfactant use.

The viscosity for utilization of emulsions in present commercial coating machines should be below about 25 cP (at 50° C. and 66 sec$^{-1}$) for slide hopper coatings, the term low viscosity as utilized in the description of this invention is intended to mean viscosity of below about 25 cP (at 50° C. and 66 sec$^{-1}$). It is understood that the surfactant of the invention may also be used in very small amounts for higher viscosity dispersion melts may be appropriate, such as in the case where coated layers are made, forming stable, simultaneously free falling, vertical curtain of a multilayer composite impinging on a moving surface onto which the coating is to be made (curtain coating; prior art U.S. Pat. No. 3,508,947). However, the invention particularly is directed to the use of low viscosity dispersion melts, such as necessary for commercial slide hopper coating (U.S. Pat. No. 2,761,791).

The couplers utilized in forming the fine particles of the invention may be any couplers that are used in photographic or other small particle dispersion applications. Typical of such couplers are image couplers. Preferred couplers for use in the invention are those indicated earlier as compounds P and Q.

All viscosity values reported in this invention are in the units of centipoise (CP). These were measured at 50° C. and 66 reciprocal seconds of shear using either a Brookfield LVDT viscometer for viscosities lower than 100 CP or a Contraves Rheomat-108 for viscosities larger than 100 CP.

EXAMPLES

The following examples are intended to be illustrative of the invention and not exhaustive in describing all its forms. Parts and percentages are by weight unless otherwise indicated.

EXAMPLE 1

(Small Particle Prior Art Control Dispersion of Coupler P)

This example utilizes a process and apparatus generally as schematically illustrated FIG. 5, as well as in copending and coassigned U.S. Pat. application Ser. No. 07/297,005 filed Jan. 17, 1989, and hereby incorporated by reference. The coupler solution, surfactant solution, and acid solution are prepared as follows:

| Coupler solution: | |
|---|---|
| Coupler P | 3000 g |
| 20% NaOH | 750 g |
| n-propanol | 7500 g |

| | |
|---|---|
| Flow rate: | 11250 g<br>547 g/min |

The above ingredients are mixed together and heated to 55° C. to dissolve the coupler and then cooled to 30° C. before use.

| | |
|---|---|
| Surfactant solution: | |
| High purity water | 45000 g |
| Aerosol A102 (33% is water) | 2250 g |
| (Prior Art Surfactant Y) | 47250 g |
| Flow rate: | 3030 g/min |
| Acid solution: | |
| Propionic acid | 375 g |
| High purity water | 2125 g |
| | 2500 g |
| Flow rate: | Approximately 106 g/min (adjusted to control the pH of the dispersion between 5.9 to 6.1). |

The description of the apparatus set up for this example is as follows:
Temperature-controlled, open-top vessels
Gear pumps with variable-speed drives
The mixer is a high fluid shear centrifugal mixer operated with a typical residence time of about 2 sec.
A SWAGE-LOC "T" fitting joining surfactant and coupler streams
Residence time in pipe between T fitting and mixer is <<1 sec.
In line pH probe is used to monitor pH in the pipe exiting the mixer
Positive displacement pump for recirculation in batch ultrafiltration
Ultrafiltration membrane is OSMONICS 20K PS 3' by 4" spiral wound permeator

PROCESS DESCRIPTION

The three solutions are continuously mixed in the high speed mixing device in which the ionized and dissolved coupler is reprotonated causing precipitation. The presence of the surfactant stabilizes the small particle size dispersion. The salt byproduct of the acid/base reaction is sodium propionate. Ultrafiltration is used for constant-volume washing with distilled water to remove the salt and the solvent (n-propanol) from the crude dispersion. The recirculation rate is approximately 20 gal/min. with 50 psi back pressure which gives a permeate rate of about 1 gal/min. The washed dispersion is also concentrated by ultrafiltration to the desired final coupler concentration of about 10–15 weight percent. The time to perform the ultrafiltration and produce the final coupler concentration is about 1 hour. Average particle diameter is about 16 nanometers as measured by Photon Correlation Spectroscopy.

It is to be noted that this fine particle dispersion was, therefore, made with 25% by weight of or art surfactant Y (Aerosol A102) based upon the weight of the coupler. After washing of the dispersion by dia filtration, some of the surfactant is usually removed. The amount depends on the coupler, the surfactant, and the size of particle formed. In general, it has been observed that 70% of the surfactant still remains in the washed dispersion.

EXAMPLE 2

(Small Particle Prior Art Control Dispersion of Coupler Q)

This example utilizes a process and apparatus generally as schematically illustrated in FIG. 5. The coupler solution, surfactant solution, and acid solution are prepared as follows:

| | |
|---|---|
| Coupler solution: | |
| Coupler Q | 3200 g |
| 20% NaOH | 800 g |
| n-propanol | 6400 g |
| | 10400 g |
| Flow rate: | 550 g/min |

The above ingredients are mixed together and heated to 50° C. to dissolve the coupler and then cooled to 30° C. before use.

| | |
|---|---|
| Surfactant solution: | |
| High purity water | 48000 g |
| Prior Art Surfactant X Aerosol OT | 480 g |
| Methanol | 960 g |
| | 49440 g |
| Flow rate: | 2615 g/min |
| Acid solution: | |
| Propionic acid | 375 g |
| High purity water | 2125 g |
| | 2500 g |
| Flow rate: | Approximately 106 g/min (adjusted to control the pH of the dispersion between 5.9 to 6.1). |

The description of the apparatus set up for this example is in Example 1. The fine particle dispersions are precipitated in the same manner as in Example 1. The dispersion is washed and concentrated by ultrafiltration in the same manner as in Example 1 to between 10–15% weight of the coupler. The average particle diameter was about 22 nm as measured by photo correlation spectroscopy. It is to be noted that this fine particle dispersion was, therefore, made with 15% by weight of the prior art surfactant-X (Aerosol OT) based upon the weight of the coupler. After washing of the dispersion by diafiltration, some of the surfactant is usually removed. The amount depends upon the coupler, the surfactant, and the size of particle formed. In general, it is observed that 70% of the surfactant still remains in the washed dispersions.

EXAMPLE 3

(Large Particle Prior Art Conventional Dispersion of Coupler Q)

This example utilizes a process and apparatus generally as schematically illustrated in FIG. 5. The coupler solution, surfactant solution, and acid solution are prepared as follows:

| | |
|---|---|
| Coupler solution: | |
| Coupler Q | 3200 g |
| 20% NaOH | 800 g |
| Methanol | 6400 g |
| | 10400 g |

-continued

| Flow rate: | 550 g/min |
|---|---|

The above ingredients are mixed together and heated to 50° C. to dissolve the coupler and then cooled to 30° C. before use.

| Surfactant solution: | |
|---|---|
| High purity water | 48000 g |
| Prior Art Surfactant X Aerosol-OT (American Cyanamid) | 96 g |
| This Invention Surfactant A-1, 10G (50% in water) | 1576 g |
| Methanol | 192 g |
| | 49864 g |
| Flow rate: | 2637 g/min |
| Acid solution: | |
| Propionic acid | 375 g |
| High purity water | 2125 g |
| | 2500 g |
| Flow rate: | Approximately 106 g/min (adjusted to control the pH of the dispersion between 5.9 to 6.1). |

The description of the apparatus set up for this example is in Example 1. The fine particle dispersion precipitated in the same manner as in Example 1. The dispersion is washed and concentrated by ultrafiltration in the same manner as in Example 1 to between 10–15% weight of the coupler. The average particle diameter is found to be about 26 nm as measured by PCS.

It is to be noted that this fine particle dispersion was, therefore, made with 3% by weight of the prior art surfactant-X (Aerosol-OT) and 25% by weight of the surfactant A-1 (Olin 10G) of the invention, based upon the weight of the coupler. After washing of the dispersion by diafiltration, some of the surfactant is usually removed. The amount depends on the coupler, the surfactant, and the size of particle formed. In general, it is observed that about 70% of the surfactant still remains in the washed dispersions.

EXAMPLE 4

(Large Particle Conventional Prior Art Control Melt of Coupler P)

A prior art large particle dispersion of coupler P is prepared by milling procedure. The final dispersion has a composition of

| 12.92% of Coupler P |
| 3.23% of Dibutyl Phthlate |
| 3.23% of 2-(2-butoxyethoxy)-ethyl Acetate |
| 8.74% of gel, and rest water. |

This dispersion has an average particle diameter of about 200 nm as determined by Sedimentation Field Flow Fractionation. The surfactant used is the prior art surfactant-Z at a concentration of about 3% based upon the coupler amount. Coupler P is the yellow coupler used in Ektacolor Paper 2001 (R. E. Atwell, U.S. Pat. No. 4,269,927) products manufactured by Eastman Kodak Co. The coating dispersion melt has a viscosity of 26 cp at 55° C. and 66 cm$^{-1}$. Using this dispersion, a full multilayer Ektacolor paper experimental paper is coated. The paper after exposure and processing using the prior art development process of S. Vincent World Patent WO 87/04534 coated gives a reflection blue $D_{max}$ of about 2.2. This example constitutes Ektacolor Paper prior art. Summary of this example is listed in Table I. Laydown of all of the couplers, sensitized AgCl emulsions, UV absorber dispersion and hardener are identical to that in Ektacolor paper.

EXAMPLE 5

(Large Particle Conventional Prior Art Control Melt of Coupler Q)

A prior art large particle dispersion of coupler Q was prepared by a milling procedure. The final dispersion had a composition of 8.74% of Coupler Q
3.72% of image stabilizer compound I
0.87% of compound II
4.37% of Dibutyl phthalate
8.69% of gelatin, and rest water

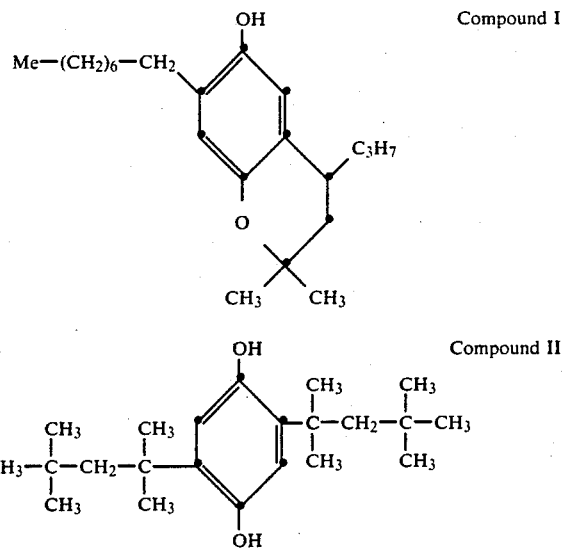

The dispersion has an average particle diameter of about 200 nm as measured by Sedimentation Field Plan Fractionation. The surfactant used is the prior art surfactant Z at a concentration of about 3% based upon the coupler weight. Coupler Q is the magenta coupler used in Ektacolor paper products manufactured by the Eastman Kodak Co. The dispersion when diluted to a coating melt at 8% coupler 5% gel has a melt viscosity of 15 cp at 66 sec$^{-1}$ at 55° C. Using the coupler dispersion and the green sensitized AgCl emulsion used in the magenta layer of Ektacolor paper, a magenta single layer coating was prepared at the same laydown of the compounds as in Ektacolor Paper-2001 as pointed out in Example I on a paper support. After exposing under standard condition and Processing (World Patent WO 87/04534), the magenta image gives a reflection green $D_{max}$ of about 2.0. This example constitutes a single layer Ektacolor paper prior art. Summary of this example is listed in Table I. Laydown of all of the compounds in this single layer coating is identical to that of the magenta layer of Example I, experimental multilayer Ektacolor paper coating.

EXAMPLE 6

(Small Particle Prior Art Control Melt of Coupler P)

The small particle dispersion of Coupler P (Example 1) is treated in the following manner to prepare coating melts. To 4 Kg of a small particle dispersion of Example 1 (containing 12% Coupler P) is added 25% by weight based on Coupler P of dibutyl phthalate and 25% by weight of 2-(-2-butoxyethoxy)-ethyl acetate. The mixture is stirred at 50° C. for ½ hour. The coupler solvents are all absorbed by the high surface area small particle dispersion. 1500 g of a 20%, aqueous gelatin solution is melted at 50° C. 260 g of water is added to the gel solution with stirring. Then the small particle dispersion at 50° C. is slowly added to the gel solution. This coupler melt contains 8% Coupler P and 5% gelatin and has a viscosity of 182 cP at 50° C. and 66 sec$^{-1}$. This yellow coupler dispersion is coated in a multilayer Ektacolor paper 2001 format (as indicated in Example 1) with extreme difficulty in a pilot multiple slide hopper coating machine. Several pumps are incapacitated because of the high viscosity of the yellow coupler melt. The coated paper is exposed under standard condition as in Example 1 and was Processed identically as the control Example 1. Sensitometry indicated about 12% increase of blue $D_{max}$ with increase in contrast but gave similar photographic speed within experimental error as of the control coating of Example 1.

EXAMPLE 7

(Small Particle Prior Art Control Melt of Coupler P)

The small particle dispersion of Coupler P (Example 1) is treated in the following manner to Prepare low viscosity coating melts. To 4 Kg of a small particle dispersion of Example 1 (containing 12% Coupler P) is added 25% by weight based on Coupler P of dibutyl phthalate and 25% by weight of 2-(-2-butoxyethoxy)-ethyl acetate. The mixture is stirred at 50° C. for ½ hour. The coupler solvents are all absorbed by the high surface area small particle dispersion. 1000 g of a 30%, aqueous gelatin solution is melted at 50° C. 288 g of dry prior art surfactant Y dissolved in 380 g of water is added to the gel solution with stirring. Then the small particle dispersion at 50° C. is slowly added to the gel/surfactant Y solution. This coupler melt contains 8% Coupler P and 5% gelatin and has a viscosity of 12 cP at 50° C. and 66 sec$^{-1}$. This yellow coupler dispersion is coated in a multilayer Ektacolor paper 2001 format (as indicated in Example 1) with ease in a pilot multiple slide hopper coating machine. The coated paper is exposed under standard condition as in Example 1 and was processed identically as the control Example 1. Sensitometry indicats about 10% increase of blue $D_{max}$ with increase in contrast but gives similar photographic speed within experimental error as of the control coating of Example 1. One of the major problems with the use of such high levels of the prior art surfactant Y is that the coated multilayer shows very poor adhesion to the paper support, and the sensitized layer delaminates to some extent under processing conditions.

EXAMPLE 8

(Small Particle Invention Melt of Coupler P)

The small particle dispersion of Coupler P (Example 1) is treated in the following manner to Prepare low viscosity coating melts of this invention. To 4 Kg of a small particle dispersion of Example 1 (containing 12% Coupler P) is added 25% by weight based on Coupler P of dibutyl phthalate and 25% by weight of 2-(-2-butoxyethoxy)-ethyl acetate. The mixture is stirred at 50° C. for ½ hour. The coupler solvents are all absorbed by the high surface area small particle dispersion. 1500 g of a 20%, aqueous gelatin solution is melted at 50° C. 96 g of Pluronic L44 (viscosity control, with Type B surfactant of this invention). 164 g of water is added to the gel solution with stirring. Then the small particle dispersion at 50° C. is slowly added to the gel/surfactant Y solution. This coupler melt contained 8% Coupler P and 5% gelatin and has a viscosity of 9 cP at 50° C. and 66 sec$^{-1}$. This yellow coupler dispersion is coated in a multilayer Ektacolor paper 2001 format (as indicated in Example 1) with ease in a pilot multiple slide hopper coating machine. The coated paper is exposed under standard condition as in Example 1; and was processed identically as the control Example 1. Sensitometry indicated about 10% increase of blue $D_{max}$ with increase in contrast but gave similar photographic speed within experimental error as that of the control coating of Example 1. This example corresponds to a single layer Ektacolor paper of the prior art. Summary of this example is listed in Table I. Laydown of all of the compounds in this single layer coating is identical to that of the yellow layer of Example 1, experimental multilayer Ektacolor paper coating. With the surfactant of the invention, Pluronic L44, no delamination of the sensitized layer is found to occur.

EXAMPLE 9

(Small Particle Invention Melt of Coupler P)

The small particle dispersion of Coupler P (Example 1) is treated in the following manner to prepare low viscosity coating melts of this invention. To 0.4 Kg of a small particle dispersion of Example 1 (containing 12% Coupler P) is added 25% by weight based on Coupler P of dibutyl phthalate and 25% by weight of 2-(-2-butoxyethoxy) ethyl acetate. The mixture is stirred at 50° C. for ½ hour. The coupler solvents are all absorbed by the high surface area small particle dispersion. 150 g of a 20% aqueous gelatin solution is melted at 50° C. 9.6 g of the surfactant C-1* of type C of this invention dissolved in 26 g of water is added to the gel solution with stirring. Then the small particle dispersion at 50° C. was slowly added to the gel/C-1* solution. This coupler melt contained 8% Coupler P and 5% gelatin and had a viscosity of 19 cP at 50° C. and 66 sec$^{-1}$. This yellow coupler dispersion is not coated for photographic testing, but because of the low amount of added surfactant C-1* and low viscosity of the prepared melt, much the same photographic results as in Example 1 are expected.

EXAMPLE 10

(Small Particle Prior Art Melt of Coupler Q)

The small particle dispersion of Coupler Q (Example 2) prepared with the prior art surfactant X (Aerosol OT-15% by weight based upon Coupler Q) is heated in the following manner to prepare coating melts. To 4 Kg of a small particle dispersion of Example 2 (containing 12% Coupler Q) is added 50% by weight of dibutyl phthalate. The mixture was stirred at 50° C. for ½ hour. The coupler solvent is all absorbed by the high surface area small particle dispersion. 1500 g of 20% aqueous gelatin solution is melted at 50° C. 260 g of water is added to the gel solution with stirring. The small particle dispersion at 50° C. is slowly added to the gel solution. This coupler melt contained 8% Coupler Q and 5% gelatin and has a viscosity of 5600 cP at 50° C. and 66 sec$^{-1}$.

A separate conventional large particle stabilizer dispersion was prepared by the prior art procedure of milling which had the following composition:
- 8.0% of Image stabilization Compound I
- 1.9% of Compound II
- 4.0% of Dibutyl phthalate
- 6.2% of Ethyl acetate
- 5.0% of Gelatin, and remainder water The dispersion has an average particle diameter of about 200 nm as measured by Field Flow Fractionation. The surfactant used is the prior art surfactant Z at a concentration of 1% based upon the weight of Compound I.

The two dispersions were admixed and a coating was attempted in a single magenta layer Ektacolor PaPer 2001 model coating format with identical laydown of all of the compounds as in Example 5. The viscosity of the dispersion melt was so high that the coating operation failed and all attemPts to coat had to be discontinued in a slide hopper coating device.

EXAMPLE 11

(Small Particle Invention Melt of Coupler Q)

The small particle dispersion of this invention of Coupler Q (Example 3) prepared with 3% of the prior art surfactant, X (Aerosol OT) and 25% of the viscosity control surfactant A-1 type A, based upon coupler weight is treated in the following manner to prepare low viscosity coating melts: To 4 Kg of a small particle dispersion of Example 2 (containing 12% Coupler Q) was added 50% by weight of dibutyl phthalate. The mixture was stirred at 50° C. for ½ hour. The coupler solvent is all absorbed by the high surface area small particle dispersion. 1500 g of 20% aqueous gelatin solution was melted at 50° C. 260 g of water are added to the gel solution with stirring. The small particle dispersion at 50° C. is slowly added to the gel solution. This coupler melt contained 8% Coupler Q and 5% gelatin and had a viscosity of 18 cP at 50° C. and 66 sec$^{-1}$.

A separate conventional large particle stabilizer dispersion is prepared by prior art procedure of milling which had the following composition:
- 8.0% of Image stabilization Compound I
- 1.9% of Compound II
- 4.0% of Dibutyl phthalate
- 6.2% of Ethyl acetate
- 5.0% of Gelatin, and remainder water The dispersion has an average particle diameter of about 200 nm as measured by Field Flow Fractionation. The surfactant used is the prior art surfactant Z at a concentration of 1% based upon the weight of Compound I.

The two dispersions are admixed and coated in a single magenta layer Ektacolor Paper 2001 model format with identical laydown of all of the compounds as in the control Example 5. Because of the low viscosity of the coupler melt, the coatings are made with ease in a slide hopper coating device. The coatings are exposed under standard conditions as described in Example 5 and processed by RA4 development process as described in Example 5. The magenta image gave a green D$_{max}$ which was 15% greater than the control coating of Example 5 with higher contrast but within experimental error the same speed as that of the control coating of Example 5.

Table I as follows summarizes the Examples and comparisons between the Controls and the invention illustrated by the Examples.

TABLE I

Rheological Behavior of 8% Coupler 5% Gel
Containing Melts of Dispersions of Couplers P and Q
(All tests coatings and their controls were at the identical laydown of the couplers, Ag, and other addenda and processed by RA4 development process) *(Control)

| Example | Coupler | Dispersion Type | Prepared With % of Surfactant Based on Coupler | Added % of Surfactant in Geled Melt Based Upon Coupler | Viscosity of 8% Coupler 5% Gel Melt at 55° C. + 66 sec$^{-1}$ | Comments on Coatability in Multilayer Slide Hopper Coating Machine |
|---|---|---|---|---|---|---|
| 4* | P | Lg. Particle Milled Prior Art | Z - 5% (Prior Art) | None - 0% (Prior Art) | 26 | Coatable & produces acceptable yellow density in multilayer coatings (Conventional Prior Art Control) |
| 5* | Q | Lg. Particle Milled Prior Art | Z - 5% (Prior Art) | None | 15 | Coatable & produces acceptable magenta density in monochrome coatings (Conventional Prior Art Control) |
| 6* | P | Small Particle Precipitated Prior Art | Y - 25% (Prior Art) | None | 182 | Coated with extreme difficulty and produced 12% higher yellow dye density yield in multicoatings compared to Example 4 control |
| 7* | P | Small Particle Precipitated Prior Art | Y - 25% (Prior Art) | Y - 60% (Prior Art) | 12 | Coated easily and produced 10% higher yellow dye density yield in multilayer coatings compared to Example 4 control. But produced undesirable adhesion of |

TABLE I-continued

Rheological Behavior of 8% Coupler 5% Gel Containing Melts of Dispersions of Couplers P and Q
(All tests coatings and their controls were at the identical laydown of the couplers, Ag, and other addenda and processed by RA4 development process) *(Control)

| Example | Coupler | Dispersion Type | Prepared With % of Surfactant Based on Coupler | Added % of Surfactant in Geled Melt Based Upon Coupler | Viscosity of 8% Coupler 5% Gel Melt at 55° C. + 66 sec$^{-1}$ | Comments on Coatability in Multilayer Slide Hopper Coating Machine |
|---|---|---|---|---|---|---|
| | | | | | | bottom yellow layer due to the use of excessive quantity of surfactant |
| 8 | P | Small Particle Precipitated Prior Art | Y - 25% (Prior Art) | L44 - 20% (Invention Surfactant Type B) | 9 | Coated easily and produced 10% higher yellow dye density yield in multilayer coatings compared to Example 4 control. |
| 9 | P | Small Particle Precipitated Prior Art | Y - 25% (Prior Art) | C-1* - 20% (Invention Surfactant Type C) | 19 | This dispersion was not evaluated photographically but is expected to give much the same photographic result as in Example 8 |
| 10* | Q | Small Particle Precipitated Prior Art | X - 15% (Prior Art) | None | 5600 | Dispersion viscosity was so high that material was uncoatable |
| 11 | Q | Small Particle Precipitated Prior Art | X - 3% (Prior Art) A-1 - 25% (Invention Surfactant Type A) | None | 18 | Coated easily and produced 15% higher magenta dye density compared to Example 5 control |

Lg. = Large

The invention has been described with reference to preferred embodiments. However, it is to be understood that other variations and embodiments of the invention may be performed. For instance, while illustrated with one color photographic systems, it is to be understood that the invention is suitable for all color photographic systems. Further, while generally illustrated with dispersion systems containing 5% gelatin and 8% coupler by weight the surfactants of the invention also are suitable for use with other concentrations of the gelatin and coupler in the emulsion. It is also suitable for small particle film forming dispersions in other than photographic uses; such as medicinal applications in animals or for insecticides. The invention is only intended to be limited by the breadth of the claims attached hereto.

What is claimed is:

1. A melt consisting essentially of about 5 percent by weight gelatin, about 8 percent by weight coupler, and about 2 percent by weight surfactants, with the proviso that said coupler has a particle size below about 100 nm and said at least two surfactants selected from
  A. an amphiphilic surfactant selected from the group consisting of a 6 to 22 carbon atom hydrophobic tail with one or more attached hydrophilic chains comprising at least 8 oxyethylene and/or glycedyl ether groups that may or may not be terminated with a negative charge such as a sulfate group,
  and B. a block oligomeric surfactant selected from the group consisting of hydrophobic polyoxypropylene blocks (A) and hydrophilic polyoxyethylene blocks (B) joined in the manner of A-B-A, B-A-B, A-B (A-B)$_n$≡G≡(B-A)$_n$, or (B-A)$_n$≡G≡(A-B)$_n$, where G is a connective organic moiety and n is between 1 and 3, and
  C. a sugar surfactant selected from the group consisting of between one and three 6 to 22 carbon atom hydrophobic tail with one or more attached hydrophilic mono or oligosaccharidic hydrophilic chains that may or may not be terminated by a negatively charged group such as a sulfate group, to obtain sufficient low viscosity for coating.

2. The melt of claim 1 wherein said hydrophobic tails of said amphiphilic surfactant comprise 6 to about 12 carbons.

3. The melt of claim 1 wherein said small particles have a size of between about 10 and about 50 nm.

4. The melt of claim 3 wherein said small particles are between about 10 and about 30 nm.

5. The melt of claim 1 wherein said surfactants are utilized in an amount below about 25% by weight of the small particles.

6. The melt of claim 1 wherein said gelatin is present at about 5 percent by weight of said emulsion, said small particles comprise coupler, and said small particles are present in an amount of to about 8 percent by weight of said melt.

7. The melt of claim 1 wherein the viscosity of said melt is less than 20 cP at 50° C.

8. The melt of claim 1 wherein said amphiphilic surfactant comprises

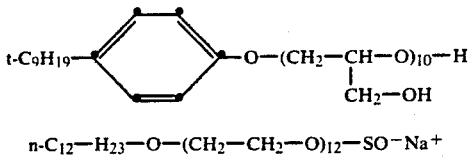

n-C₁₂—H₂₃—O—(CH₂—CH₂—O)₁₂—SO⁻Na⁺

9. The melt of claim 1 wherein said sugar surfactant comprises

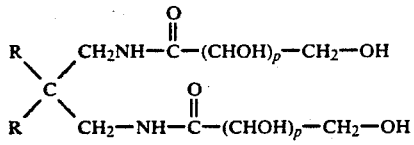

where, R = n-CH₃—(CH₂)ₓ (where X = 3 to 10)

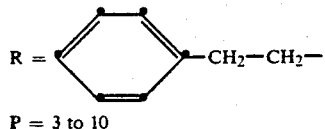

P = 3 to 10

10. The melt of claim 1 wherein said block surfactant comprises

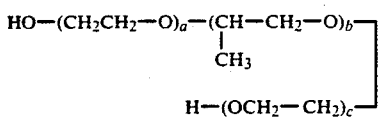

wherein
a≈c≈10
b≈20, and
the molecular weight is about 2,200.

11. A melt consisting essentially of water, about 5 percent by weight gelatin, about 8 percent by weight coupler, and about 2 percent by weight surfactants, with the proviso that said coupler has a particle size below about 100 nm and said surfactants comprise at least one surfactant selected from
  A. amphiphilic surfactants comprising 6 to 22 carbon atom hydrophobic tail with one or more attached hydrophilic chains comprising at least 8 oxyethylene and/or glycedyl ether groups that may or may not be terminated with a negative charge such as a sulfate group, and at least one surfactant selected from the group
  B. block oligomeric surfactants comprising hydrophobic polyoxypropylene blocks (A) and hydrophilic polyoxyethylene blocks (B) joined in the manner of A-B-A, B-A-B, A-B, (A-B)ₙ≡G≡(B-A)ₙ, or (B-A)ₙ≡G≡(A-B)ₙ, where G is a connective organic moiety and n is between 1 and 3 to obtain sufficient low viscosity for coating.

12. The melt of claim 11 wherein said hydrophobic tails of said amphiphilic surfactant comprise 6 to 12 carbons.

13. The melt of claim 11 wherein said small particles have a size of between about 10 and about 50 nm.

14. The melt of claim 3 wherein said small particles are between about 10 and about 30 nm.

15. The melt of claim 11 wherein said surfactant is utilized in an amount below about 25% by weight of the small particles.

16. The melt of claim 11 wherein said gelatin is present at about 5 percent by weight of said emulsion, said small particles comprise coupler, and said small particles are present in an amount of up to about 8 percent by weight of said melt.

17. The melt of claim 11 wherein the viscosity of said melt is less than 20 cP at 50°60 C.

18. The melt of claim 11 wherein said amphiphilic surfactant comprises

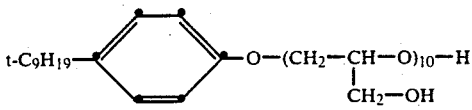

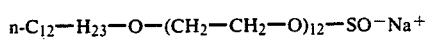

n-C₁₂—H₂₃—O—(CH₂—CH₂—O)₁₂—SO⁻Na⁺

19. The melt of claim 11 wherein said block surfactant comprises

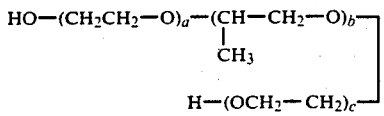

wherein
a≈c≈10
b≈20, and
the molecular weight is about 2,200.

20. A melt consisting essentially of water, about 5 percent by weight gelatin about 8 percent by weight coupler, and about 2 percent by weight surfactants, with the proviso that said coupler has a particle size below about 100 nm and said surfactants comprise at least one surfactant selected from
  A. amphiphilic surfactants comprising 6 to 22 carbon atom hydrophobic tail with one or more attached hydrophilic chains comprising at least 8 oxyethylene and/or glycedyl ether groups that may or may not be terminated with a negative charge such as a sulfate group, and at least one surfactant selected from the group
  C. sugar surfactants, comprising between one and three 6 to 22 carbon atom hydrophobic tail with one or more attached hydrophilic mono or oligosaccharidic hydrophilic chains that may or may not be terminated by a negatively charged group such as a sulfate group to obtain sufficient low viscosity for coating.

21. The melt of claim 20 wherein said hydrophobic tails of said amphiphilic surfactant comprise 6 to about 12 carbons.

22. The melt of claim 20 wherein said small particles have a size of between about 10 and about 50 nm.

23. The melt of claim 21 wherein said small particles are between about 10 and about 30 nm.

24. The melt of claim 20 wherein said surfactant is utilized in an amount below about 25% be weight of the small particles.

25. The melt of claim 20 wherein said gelatin is present at about 5 percent by weight of said emulsion, said small particles comprise coupler, and said small particles are present in an amount of up to about 8 percent by weight of said melt.

26. The melt of claim 20 wherein said viscosity of said melt is less than 20 cP at 50° C.
27. The melt of claim 20 wherein said amphiphilic surfactant comprises
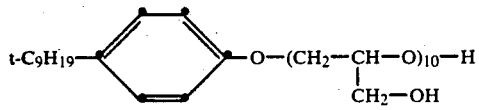
or
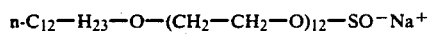
28. The melt of claim 20 wherein said sugar surfactant comprises
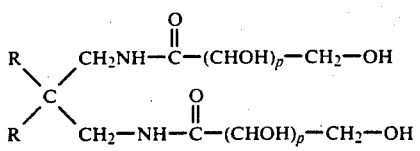
where, $R = n\text{-}CH_3\text{-}(CH_2)_x$ (where $X = 3$ to $10$)
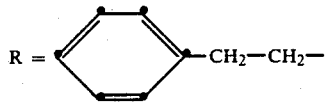
$P = 3$ to $10$
* * * * *

UNITED STATES PATENT AND TRADEMARK OFFICE
CERTIFICATE OF CORRECTION

PATENT NO. : 5,013,640

DATED : May 7, 1991

INVENTOR(S) : Pranab Bagchi, Gary J. McSweeney, and Steven J. Sargeant

It is certified that error appears in the above-identified patent and that said Letters Patent is hereby corrected as shown below:

In Column 28, line 63, insert --up-- after "of".

In Column 29, line 6, insert --or-- between formula on line 4 and line 7.

In Column 29, line 64, delete "3" and insert --13--.

In Column 30, line 34, insert --,-- after "gelatin".

In Column 30, line 62, delete "be" and insert --by--.

In Column 31, line 1, delete "said" and insert --the--.

Signed and Sealed this

Third Day of November, 1992

*Attest:*

DOUGLAS B. COMER

*Attesting Officer*      *Acting Commissioner of Patents and Trademarks*